(12) United States Patent
    Pai

(10) Patent No.: US 10,973,370 B2
(45) Date of Patent: Apr. 13, 2021

(54) MULTI-PURPOSE BARBECUE GRILL

(71) Applicant: Lucas Pai, Taichung (TW)

(72) Inventor: Lucas Pai, Taichung (TW)

( * ) Notice: Subject to any disclaimer, the term of this patent is extended or adjusted under 35 U.S.C. 154(b) by 188 days.

(21) Appl. No.: 16/426,933

(22) Filed: May 30, 2019

(65) Prior Publication Data
    US 2020/0375395 A1    Dec. 3, 2020

(51) Int. Cl.
    *A47J 37/07*    (2006.01)
    *A47J 37/04*    (2006.01)

(52) U.S. Cl.
    CPC ......... *A47J 37/0713* (2013.01); *A47J 37/041* (2013.01); *A47J 37/074* (2013.01)

(58) Field of Classification Search
    CPC ........ A47J 37/04; A47J 37/041; A47J 37/042; A47J 37/043; A47J 37/044; A47J 37/047; A47J 37/049; A47J 37/06; A47J 37/0611; A47J 37/0623; A47J 37/0629; A47J 37/0635; A47J 37/0641; A47J 37/0658; A47J 37/0682; A47J 37/0688; A47J 37/07; A47J 37/0704; A47J 37/0713; A47J 37/0718; A47J 37/0727; A47J 37/074; A47J 37/0745; A47J 37/0763; A47J 37/0786; A47J 37/08; A47J 37/0807; A47J 37/0814; A47J 37/0835; A47J 37/0842; A47J 37/085; A47J 37/0864; A47J 37/0878; A47J 37/0885; A47J 37/0892
    USPC ... 99/339, 421 R, 421 HV, 421 M, 422, 427, 99/443 R, 445, 446, 447, 448
    See application file for complete search history.

(56) References Cited

U.S. PATENT DOCUMENTS

| | | | | | |
|---|---|---|---|---|---|
| 2,182,225 | A | * | 12/1939 | Garvis | A47J 37/041 99/421 H |
| 2,245,220 | A | * | 6/1941 | Nelson | A47J 37/0623 99/421 H |
| 4,089,258 | A | * | 5/1978 | Berger | A47J 37/0688 99/339 |
| 5,195,425 | A | * | 3/1993 | Koziol | A47J 37/0713 99/421 H |
| 5,947,007 | A | * | 9/1999 | O'Grady | A47J 37/0763 99/421 H |
| 6,038,965 | A | * | 3/2000 | Thorndyke | A47J 37/0682 99/421 H |
| 6,779,519 | B2 | * | 8/2004 | Harneit | A47J 37/0727 126/39 J |
| D858,173 | S | * | 9/2019 | Hecker | D7/350.1 |
| D899,842 | S | * | 10/2020 | Pai | D7/330 |

(Continued)

*Primary Examiner* — Hung D Nguyen
(74) *Attorney, Agent, or Firm* — Birch, Stewart, Kolasch & Birch, LLP

(57) ABSTRACT

A multi-purpose barbecue grill has a body, at least one lower grate, an upper grate, a rotating skewer assembly, a heating assembly, and a drip pan. The body has a base, a back sheet, and two side walls. The base is disposed at a bottom of the body. The back sheet is mounted on a front surface of the base. The two side walls are mounted to two side surfaces of the base respectively. Each one of the two side walls has multiple supporting sets disposed on an inner surface thereon. The at least one lower grate is detachably mounted to two corresponding supporting sets of the two side walls. The upper grate is mounted to the two side walls of the body. The rotating skewer assembly is detachably mounted in the body. The heating assembly is rotatably mounted in the body. The drip pan is detachably disposed on the base of the body.

20 Claims, 8 Drawing Sheets

(56) References Cited

U.S. PATENT DOCUMENTS

2013/0112088 A1* 5/2013 May ................. A47J 37/07
                                              99/421 H
2015/0374170 A1* 12/2015 Jellis ................. A47J 37/042
                                              99/443 R

* cited by examiner

MULTI-PURPOSE BARBECUE GRILL

BACKGROUND OF THE INVENTION

1. Field of the Invention

The present invention relates to a barbecue grill, and more particularly to a multi-purpose barbecue grill that can cook food in multiple ways.

2. Description of Related Art

A conventional barbecue grill has a burning furnace and a grate disposed on the burning furnace. In use, put charcoal in the burning furnace and lit the charcoal. Then place food on the grate. Thermal energy transferred from the lit charcoal through thermal radiation can heat the food to a cooked state. However, if a user wants to roast food with a large volume such as a whole chicken, only part of the whole chicken can receive the thermal energy due to its large volume. The conventional barbecue grill cannot roast food with a large volume since it cannot heat food evenly.

Moreover, the user can only place food on the grate. However, thermal energy transferred from the charcoal put in the burning furnace travels in all directions. The conventional barbecue grill only utilizes thermal energy transferred upwardly from the lit charcoal. Heat energy traveling along directions other than the upwardly-traveled heat energy is not utilized. Overall, the conventional barbecue grill cannot roast food with a large volume, and configuration of the conventional barbecue grill causes low utilization rate of the thermal energy.

To overcome the shortcomings of the conventional barbecue grill, the present invention tends to provide a multi-purpose barbecue grill to mitigate or obviate the aforementioned problems.

SUMMARY OF THE INVENTION

The main objective of the present invention is to provide a multi-purpose barbecue grill that can cook food in multiple ways.

The multi-purpose barbecue grill in accordance with the present invention has a body, at least one lower grate, an upper grate, a rotating skewer assembly, a heating assembly, and a drip pan. The body has a base, a back sheet, and two side walls. The base is disposed at a bottom of the body. The back sheet is mounted on a front surface of the base, and has a placement slot and multiple insertion slots. The placement slot is formed through the back sheet. The multiple insertion slots are disposed at spaced intervals along a vertical direction and are located above the placement slot, and each one of the multiple insertion slots is formed through the back sheet. The two side walls are mounted to two side surfaces of the base respectively. One of the two side walls has a positioning groove formed through the side wall along a longitudinal direction of the back sheet. The other one of the two side walls has an insertion hole formed through the side wall. The insertion hole is opposite the positioning groove.

Each one of the two side walls has multiple supporting sets disposed at spaced intervals on an inner surface thereon along the vertical direction. Each one of the multiple supporting sets is located on a same horizontal plane with a respective one of the multiple insertion slots of the back sheet and with a respective one of the multiple supporting sets of the other one of the two side walls. The at least one lower grate is detachably mounted to two corresponding said supporting sets that are located on the same horizontal plane and to one of the multiple insertion slots that is located on the same horizontal plane with said two corresponding supporting sets, and has, two sides, a handle, and an abutting portion. The handle is disposed at one of the two sides of the at least one lower grate. The abutting portion is disposed at the other one of the two sides of the at least one lower grate away from the handle, and is inserted into one of the multiple insertion slots of the back sheet. The upper grate is mounted to the two side walls of the body.

The rotating skewer assembly is detachably mounted in the body and has a skewer and an actuator. The skewer is located between the at least one lower grate and the upper grate, and has two ends. One of the two ends of the skewer extends into the positioning groove, and the other end of the skewer extends out of the body via the insertion hole. The actuator is mounted to the side wall that has the insertion hole, and has a connecting hole mounted to the end of the skewer that extends out of the body via the insertion hole, such that the skewer is driven to rotate by the actuator.

The heating assembly is rotatably mounted in the body, and has a rotating shaft, a burning furnace, a heater set, and a knob. The rotating shaft is located between the skewer and the upper grate, and has two ends mounted to the two side walls of the body respectively, such that the rotating shaft is rotatable relative to the two side walls of the body. The burning furnace is mounted on the rotating shaft, such that the burning furnace is capable of rotating along with the rotating shaft. The heater set is mounted to the body and is connected to the burning furnace. The knob is mounted to one of the two side walls of the body, and is connected to one of the two ends of the rotating shaft, such that the burning furnace is rotatable along with the rotating shaft when the knob is rotated to make the rotating shaft rotate. The drip pan is detachably disposed on the base of the body, is located below the at least one lower grate, and has a flange abutting against the placement slot of the back sheet.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
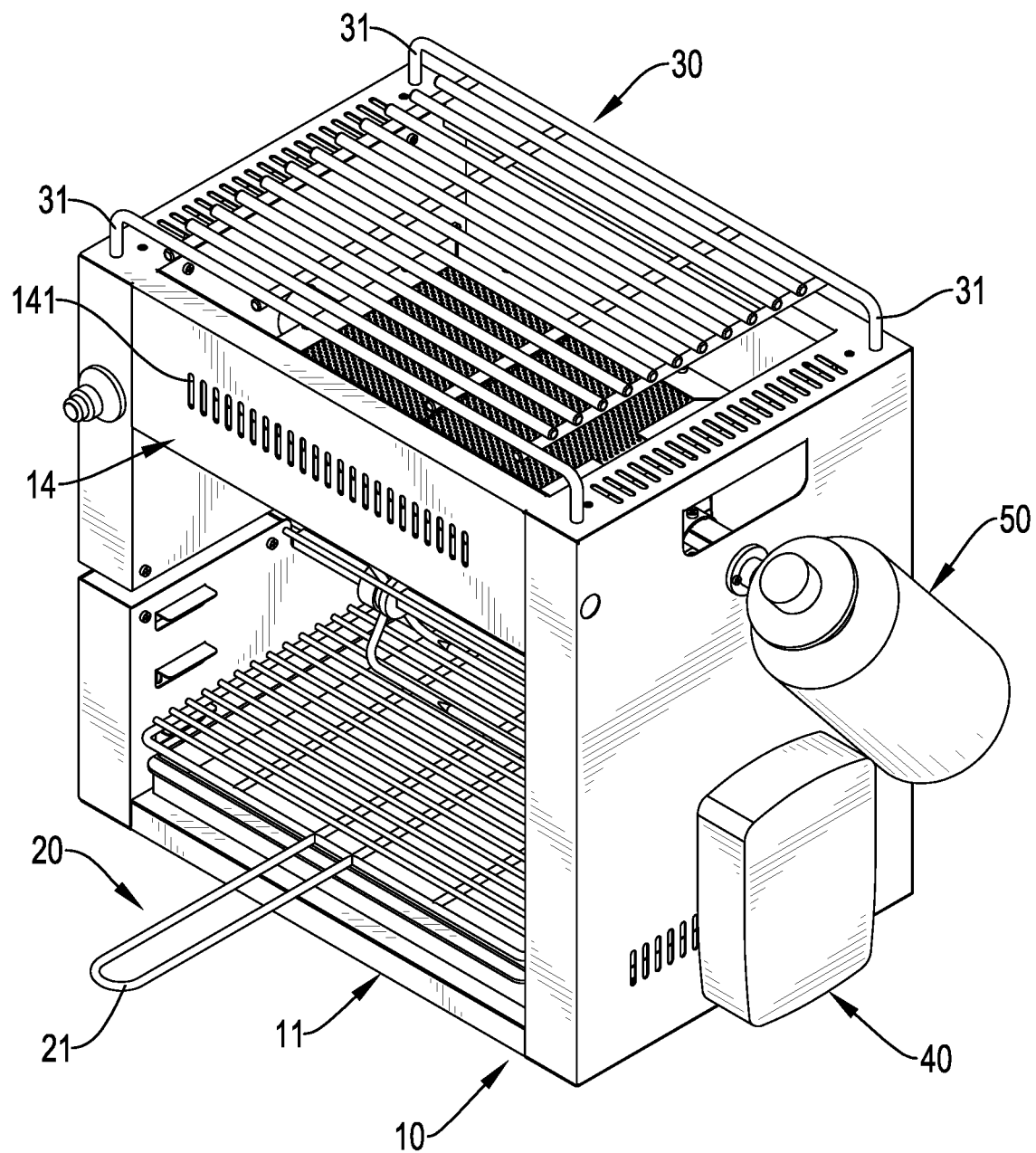
FIG. 1 is a perspective view of a multi-purpose barbecue grill in accordance with the present invention.
Figure 2:
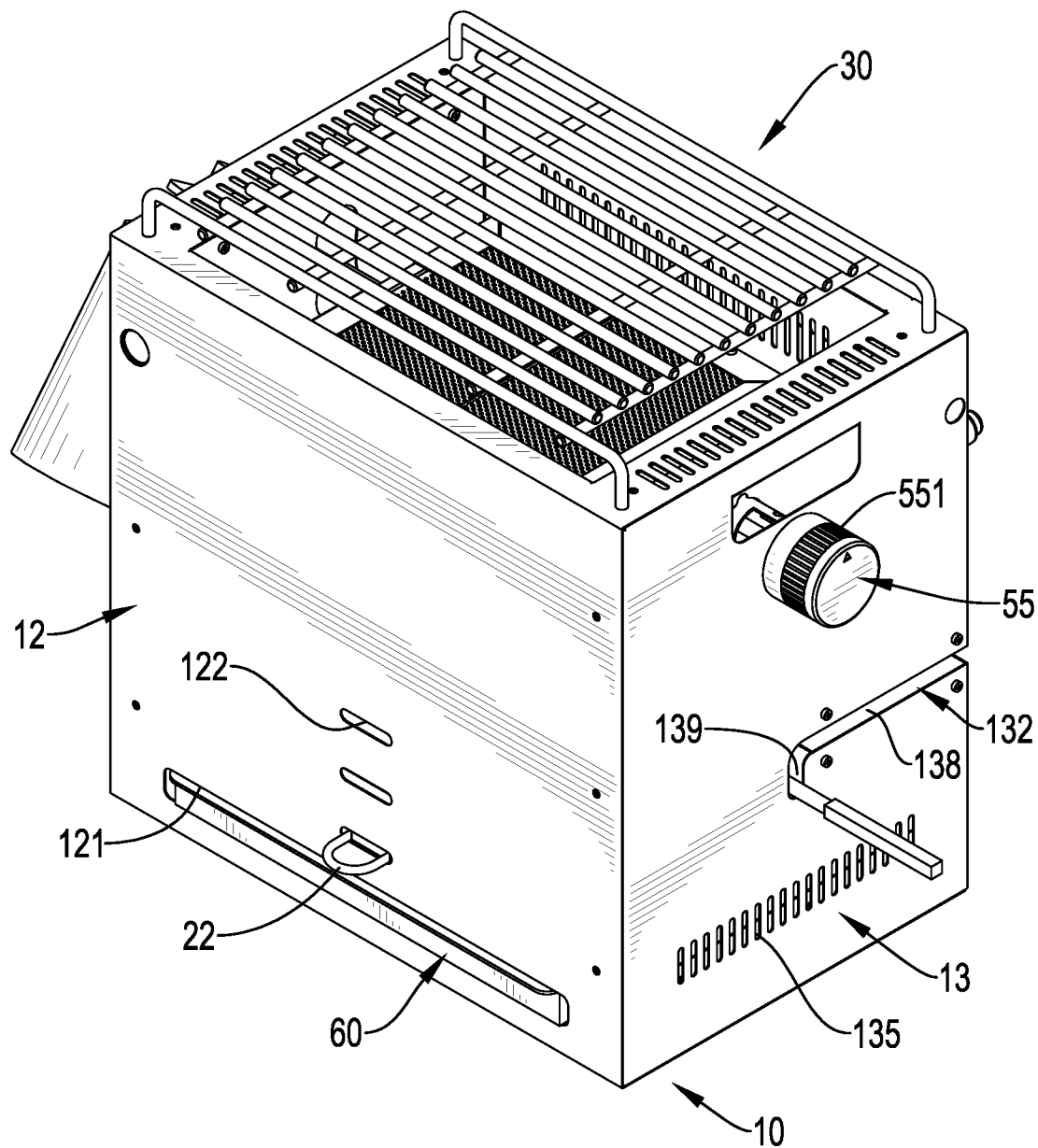
FIG. 2 is another perspective view of the multi-purpose barbecue grill in FIG. 1.
Figure 3:
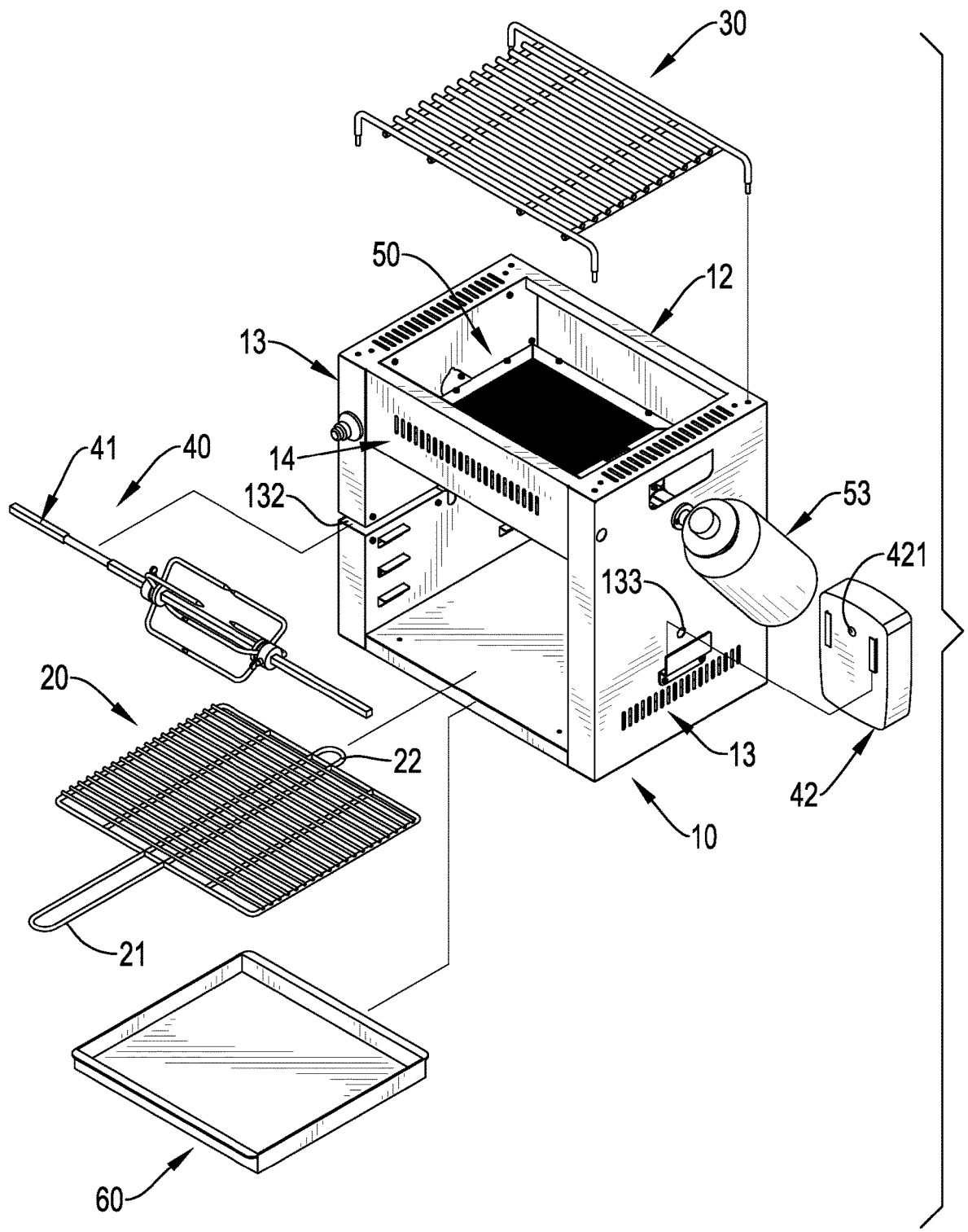
FIG. 3 is an exploded perspective view of the multi-purpose barbecue grill in FIG. 1.

With reference to FIGS. 1 to 3, a multi-purpose barbecue grill in accordance with the present invention comprises a body 10, at least one lower grate 20, an upper grate 30, a rotating skewer assembly 40, a heating assembly 50, and a drip pan 60.

Figure 4:
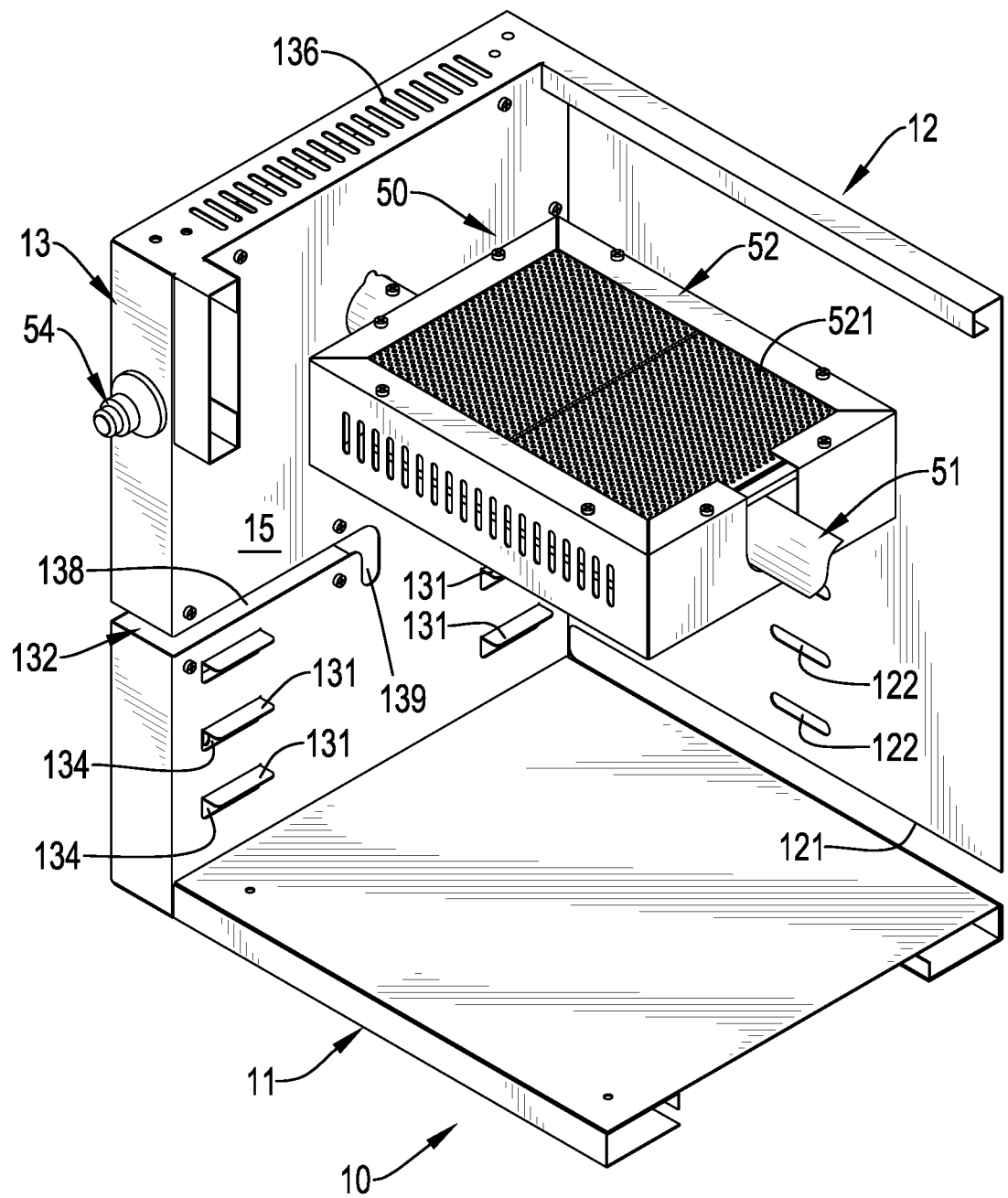
FIG. 4 is a perspective view in partial section of the multi-purpose barbecue grill in FIG. 1.

With reference to FIGS. 1, 2, and 4, the body 10 has a base 11, a back sheet 12, two side walls 13, a baffle 14, and a containing space 15. The base 11 is disposed at a bottom of the body 10. With reference to FIGS. 2 and 4, the back sheet 12 is mounted on a front surface of the base 11 and has a placement slot 121 and multiple insertion slots 122. The placement slot 121 is formed through the back sheet 12 and is disposed adjacent to a bottom of the back sheet 12. Each one of the multiple insertion slots 122 is formed through the back sheet 12. The multiple insertion slots 122 are disposed at spaced intervals along a vertical direction and are located above the placement slot 121. The two side walls 13 are mounted to two side surfaces of the base 11 respectively, and the two side walls 13 laterally extend from two opposite ends of the back sheet 12 respectively. Each one of the two side walls 13 has multiple supporting sets disposed at spaced intervals on an inner surface thereof along the vertical direction. Each one of the multiple supporting sets is located on a same horizontal plane with a respective one of the multiple insertion slots 122 of the back sheet 12 and with a respective one of the multiple supporting sets of the other one of the two side walls 13.

Each one of the multiple supporting sets has two supporting elements 131. Each one of the two supporting elements 131 extends from the side wall 13. The two supporting elements 131 are disposed at a spaced interval along a horizontal direction. One of the two side walls 13 has a positioning groove 132. The positioning groove 132 is formed through the side wall 13 along a longitudinal direction of the back sheet 12. Furthermore, the positioning groove 132 has a horizontal section 138 and a vertical section 139. The horizontal section 138 is disposed away from the back sheet 12. The vertical section 139 communicates with the horizontal section 138 and is disposed adjacent to the back sheet 12.

With reference to FIG. 3, the side wall 13 that does not have the positioning groove 132 has an insertion hole 133 formed through the side wall 13. The insertion hole 133 is aligned with a bottom of the vertical section 139 of the positioning groove 132. With reference to FIG. 3, the baffle 14 is mounted to the two side walls 13, is disposed between the two side walls 13, is disposed adjacent to a top surface of each one of the two side walls 13, and faces the back sheet 12. The baffle 14 forms an opening with the two side walls 13 and the back sheet 12 together, and the opening is located between the baffle 14, the two side walls 13, and the back sheet 12. The containing space 15 is formed between the base 11, the back sheet 12, the two side walls 13, and the baffle 14, and the containing space 15 communicates with the opening.

With reference to FIGS. 1, 2, and 4, in the present invention, each one of the two side walls 13 is hollow and has multiple heating vents 134, multiple side air vents 135, and multiple top air vents 136. Each one of the multiple heating vents 134 is located below a respective one of the multiple supporting elements 131, and is formed through the inner surface of the side wall 13. Each one of the multiple side air vents 135 is formed through an outer surface of the side wall 13, and the multiple side air vents 135 are disposed at spaced intervals. Each one of the multiple top air vents 136 is formed through the top surface of the side wall 13, and the multiple top air vents 136 are disposed at spaced intervals. The baffle 14 is hollow and has multiple vents 141. Part of the multiple vents 141 are formed through an inner surface of the baffle 14. The rest of the multiple vents 141 are formed through an outer surface of the baffle 14. When thermal energy is accumulated in the containing space 15, air in the containing space 15 flows into each one of the two hollow side walls 13 via the multiple heating vents 134. Also, air in the containing space 15 flows into the hollow baffle 14 via the multiple vents 141 formed through the inner surface of the baffle 14. Air contained in the two hollow side walls 13 and the hollow baffle 14 then flows out of the body 10 via the multiple side air vents 135, the multiple top air vents 136, and the multiple vents 141 of the baffle 14, such that the thermal energy accumulated in the containing space 15 can be transferred through heat convection.

With reference to FIGS. 1 to 3, the at least one lower grate 20 is detachably mounted in the body 10. The at least one lower grate 20 is detachably mounted to two corresponding supporting sets of the two side walls 13 that are located on a same horizontal plane and mounted to a respective one of the multiple insertion slots 122 of the back sheet 12 that is located on the same horizontal plane with said two corresponding supporting sets. The at least one lower grate 20 has two sides, a handle 21 and an abutting portion 22. The handle 21 is disposed at one of the two sides of the at least one lower grate 20, and the abutting portion 22 is disposed at the other one of the two sides of the at least one lower grate 20 that is away from the handle 21. In use, hold the handle 21 and insert the abutting portion 22 of the at least one lower grate 20 into one of the multiple insertion slots 122 of the back sheet 12, and put the at least one lower grate 20 on the two corresponding supporting sets that are located on the same horizontal plane with the corresponding insertion slot 122. Users can change a number of the at least one lower grate 20 according to practical need, and the number of the at least one lower grate 20 is not limited in the present invention. With reference to FIGS. 1 to 3, the upper grate 30 has four corners on its bottom surface and four supporting studs 31, and each one of the four supporting studs 31 extends from a respective one of the four corners of the upper grate 30 downwardly. Two adjacent supporting studs 31 of the upper grate 30 are inserted into the top surface of one of the two side walls 13, and the other two adjacent supporting studs 31 of the upper grate 30 are inserted into the top surface of the other one of the two side walls 13. The upper grate 30 is located above the opening of the body 10.

With reference to FIGS. 1 and 3, the rotating skewer assembly 40 is detachably and rotatably mounted in the body 10, is located between the at least one lower grate 20 and the upper grate 30, and has a skewer 41 and an actuator 42. The skewer 41 is located between the at least one lower grate 20 and the upper grate 30, and the skewer 41 has two ends. With reference to FIGS. 2 to 4, one of the two ends of the skewer 41 extends into the horizontal section 138 of the positioning groove 132, and then extends into the vertical section 139 of the positioning groove 132. At last, the end of the skewer 41 that extends into the positioning groove 132 abuts against a bottom end of the vertical section 139. The other one of the two ends of the skewer 41 extends out of the body 10 via the insertion hole 133 of the side wall 13 that does not have the positioning groove 132. The actuator 42 is mounted to the side wall 13 that has the insertion hole 133, and the actuator 42 has a connecting hole 421. The connecting hole 421 of the actuator 42 is mounted to the end of the skewer 41 that extends out of the body 10 via the insertion hole 133, and the actuator 42 is capable of making the skewer 41 rotate. In this way, users do not have to rotate the skewer 41 continuously in order to evenly heat the food placed on the skewer 41. Moreover, since the positioning groove 132 has the horizontal section 138 and the vertical section 139, the skewer 41 is received in the vertical section 139 and does not slip out of the positioning groove 132 via the horizontal section 138 while rotating.

With reference to FIGS. 2 to 4, the heating assembly 50 is rotatably mounted in the body 10, is located in the containing space 15, and has a rotating shaft 51, a burning furnace 52, a heater set, and a knob 55. The rotating shaft 51 is located between the skewer 41 and the upper grate 30, and has two ends mounted to the two side walls 13 of the body 10 respectively, such that the rotating shaft 51 is rotatable relative to the two side walls 13. The rotating shaft 51 is mounted through the burning furnace 52, so the burning furnace 52 is capable of rotating along with the rotating shaft 51. The burning furnace 52 is located in the containing space 15 and has a grid 521 mounted on its top. The grid 521 has multiple holes disposed at spaced intervals thereon. The heater set is mounted to the body 10 and is connected to the burning furnace 52 to provide the burning furnace 52 with a heating source. Furthermore, the heater set has a gas canister 53 and a tap 54. The gas canister 53 is fixed on the side wall 13 that has the insertion hole 133, and communicates with the burning furnace 52 via the rotating shaft 51. The tap 54 is connected to the burning furnace 52 via a pipeline.

To generate heat, put charcoal in the burning furnace 52, and then release gas from the gas canister 53 into the burning furnace 52. Next, turn the tap 54 on, and then the charcoal is lit. Lit charcoal can heat and roast food placed on the at least one lower grate 20, food placed on the upper grate 30, and food placed on the skewer 41 via the grid 521 through thermal radiation and heat convection. The knob 55 is mounted to the side wall 13 that has the positioning groove 132, and is connected to the end of the rotating shaft 51 away from the gas canister 53. By rotating the knob 55, the rotating shaft 51 can rotate along with the knob 55, and the burning furnace 52 is also rotatable along with the rotating shaft 51 relative to the two side walls 13 as shown in FIGS. 5 to 8.

Besides, the knob 55 has a sleeve 551 covering its outer surface, and the sleeve 551 has an insulation effect. The sleeve 551 prevents users from being scalded while rotating the knob 55, and the sleeve 551 enhances friction force between hands of the user and the sleeve 551, such that the user can rotate the knob 55 easily. In addition, with reference to FIG. 5, the burning furnace 52 is obstructed by the baffle 14. In such a configuration, the baffle 14 shelters the user from thermal energy emitted by the burning furnace 52 transferred through thermal radiation, which prevents the user from feeling uncomfortable due to high temperature.

Figure 5:
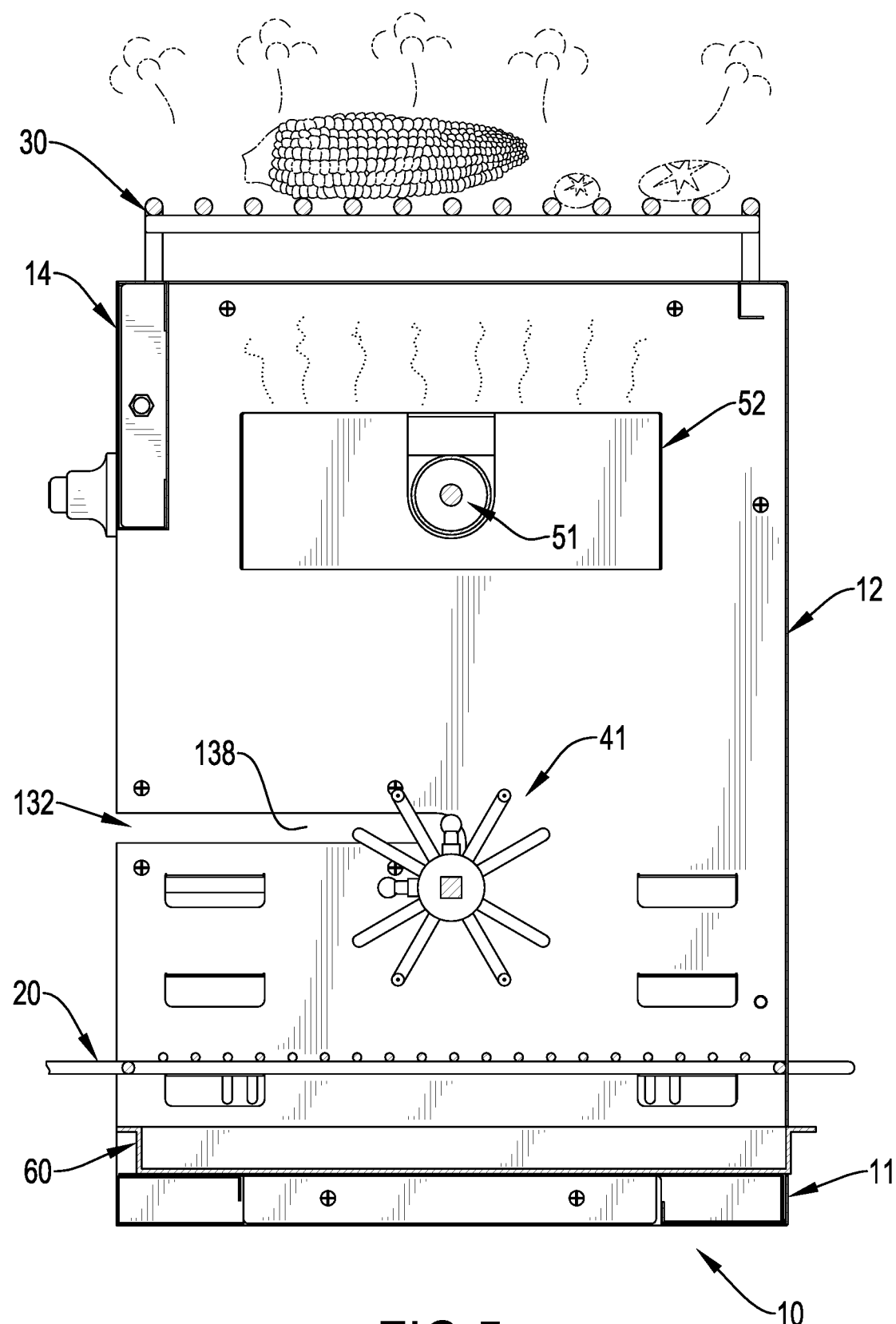
FIG. 5 is an operational cross-sectional side view of the multi-purpose barbecue grill in FIG. 1.

With reference to FIGS. 3 and 5, the drip pan 60 is detachably disposed on the base 11 of the body 10, and is located below the at least one lower grate 20. A flange of the drip pan 60 abuts against the placement slot 121 of the back sheet 12. The drip pan 60 can receive grease dripped from food placed on the skewer 41 and the at least one lower grate 20.

Figure 6:
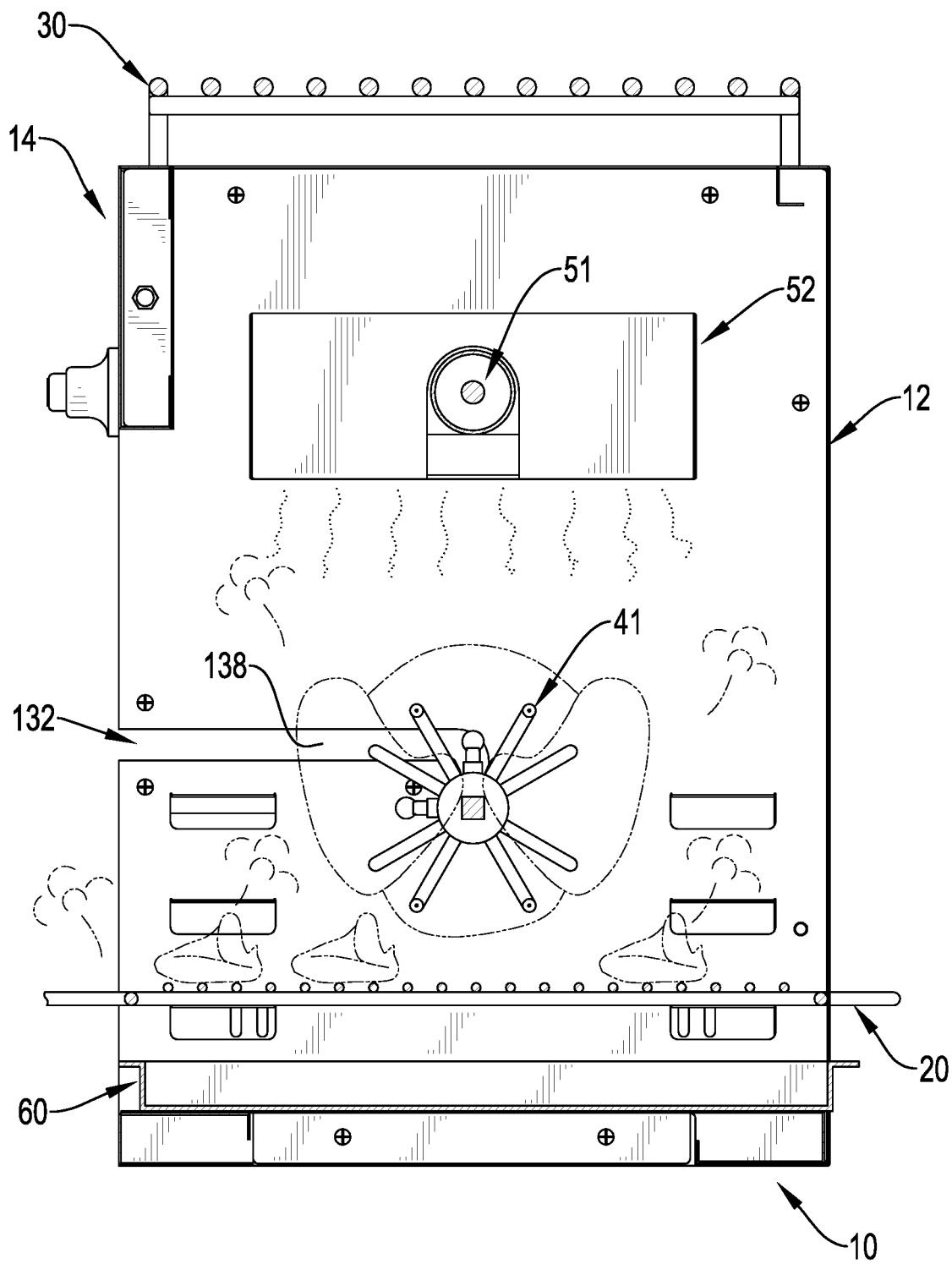
FIG. 6 is another operational cross-sectional side view of the multi-purpose barbecue grill in FIG. 1.

With reference to FIG. 5, to roast food placed on the upper grate 30, rotate the knob 55 and make the grid 521 of the burning furnace 52 face the upper grate 30. Heat generated in the burning furnace 52 is thereby transferred to food placed on the upper grate 30 through thermal radiation and heat convection. With reference to FIG. 6, to roast food placed on the at least one lower grate 20 and food placed on the skewer 41, rotate the knob 55 and make the grid 521 of the burning furnace 52 face downward. Heat generated in the burning furnace 52 is then transferred to food placed on the at least one lower grate 20 and food placed on the skewer 41 through thermal radiation and heat convection.

Figure 7:
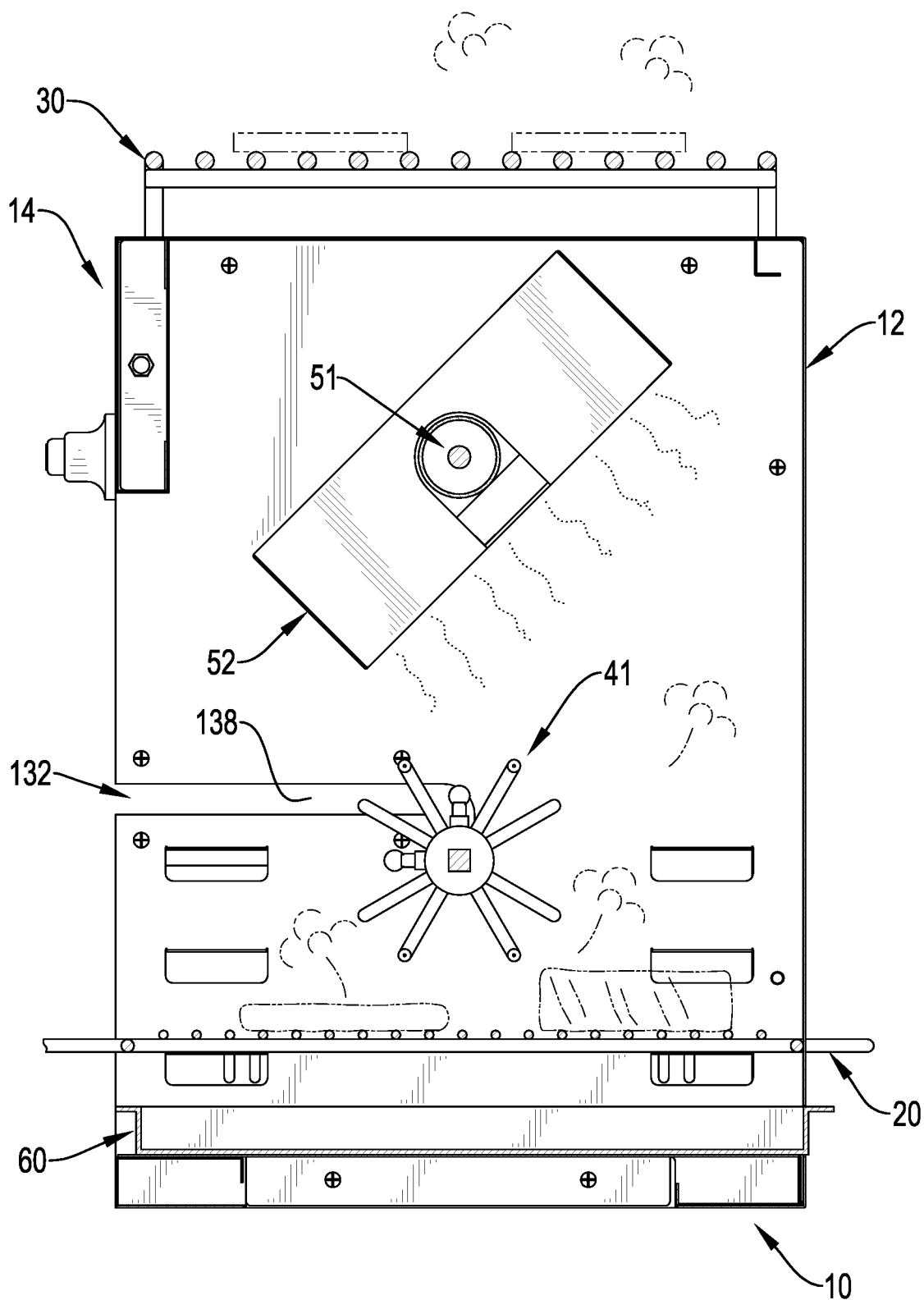
FIG. 7 is further another operational cross-sectional side view of the multi-purpose barbecue grill in FIG. 1.
Figure 8:
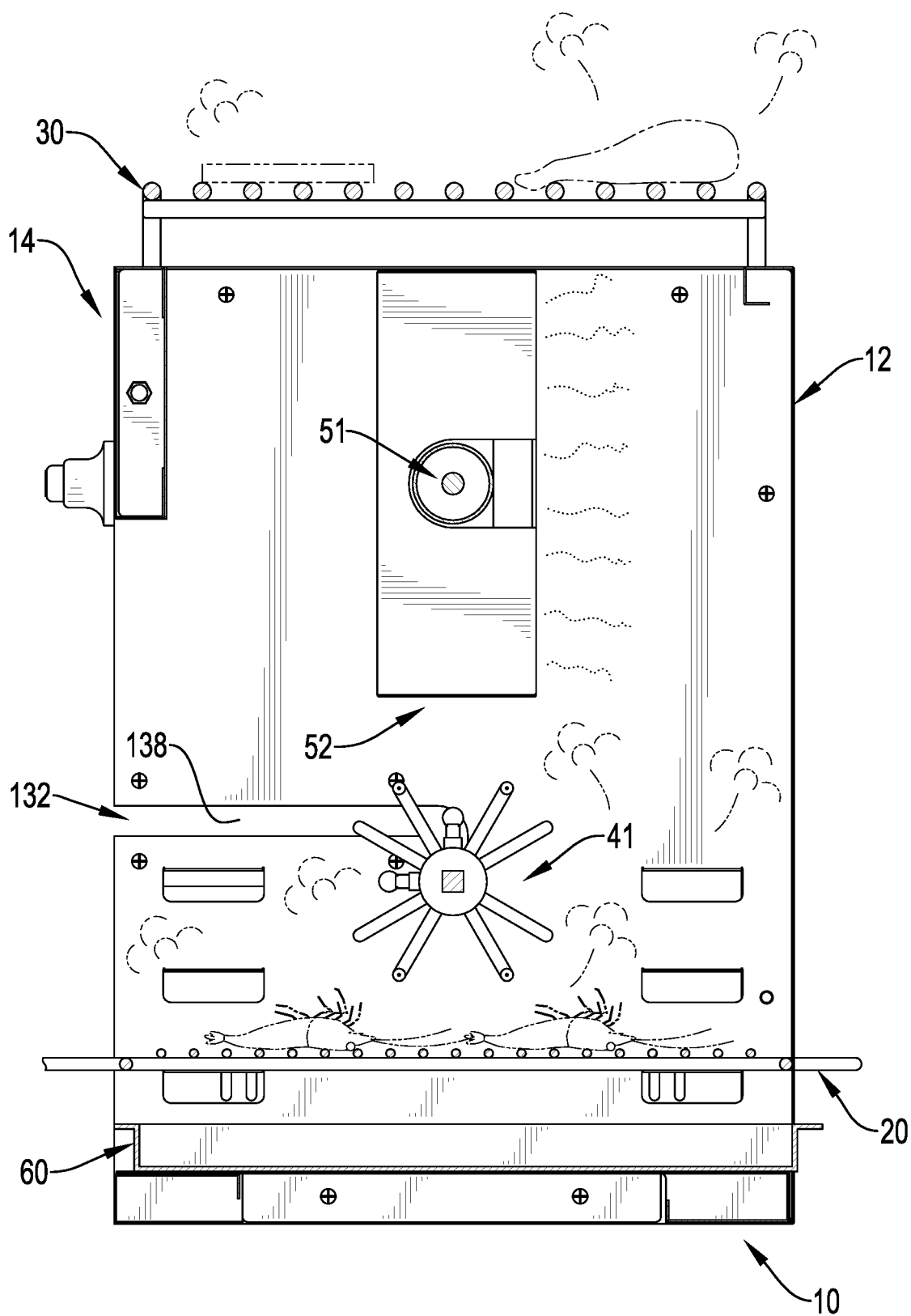
FIG. 8 is yet another operational cross-sectional side view of the multi-purpose barbecue grill in FIG. 1.

When the user needs to roast a quantity of food that exceeds a capacity of the at least one lower grate 20 or the upper grate 30, the user has to place some of the food on the at least one lower grate 20, and put the other food on the upper grate 30. Under this circumstance, the burning furnace 52 can be adjusted to different angles as shown in FIG. 7 or FIG. 8. When the burning furnace 52 is adjusted to an angle as shown in FIG. 7, the grid 521 of the burning furnace 52 is inclined toward the back sheet 12 of the body 10. The present invention is capable of roasting food of different thickness in such a configuration. Place food with larger thickness on a position on the at least one lower grate 20 near the back sheet 12, and put food with smaller thickness on a position on the at least one lower grate 20 away from the back sheet 12 or on the upper grate 30. When the burning furnace 52 is adjusted to an angle as shown in FIG. 8, the grid 521 of the burning furnace 52 faces the back sheet 12 of the body 10. Since thermal energy is accumulated between the burning furnace 52 and the back sheet 12, users can put food that requires longer cooking time on a position on the at least one lower grate 20 near the back sheet 12 or on a position on the upper grate 30 near the back sheet 12.

With the aforementioned features and technical characteristics, the multi-purpose barbecue grill in accordance with the present invention has the following advantages.

1. The multi-purpose barbecue grill not only has the at least one lower grate 20 and the upper grate 30, but also has the rotating skewer assembly 40. Users can place food with a large volume such as a whole chicken on the skewer 41 of the rotating skewer assembly 40, and make the skewer 41 rotate by the actuator 42. In this way, users do not have to rotate the skewer 41 continuously in order to evenly heat food placed on the skewer 41. Compared with the conventional barbecue grill that is not suitable for roasting food with a large volume, the rotating skewer assembly 40 of the present invention is more suitable for roasting food with a large volume. In addition, the rotating skewer assembly 40 rotates automatically, which saves time for roasting food and enables users to enjoy food with less distraction.

2. The upper grate 30 is located above the heating assembly 50, and the at least one lower grate 20 and the rotating skewer assembly 40 are located below the heating assembly 50. In such a configuration, thermal energy transferred in all directions from the charcoal put in the burning furnace 52 through thermal radiation is fully utilized. Furthermore, users can place much food on the at least one lower grate 20, on the upper grate 30, or on the skewer 41 of the rotating skewer assembly 40, and a number of the at least one lower grate 20 can even be increased. Because the present invention can contain and cook more food than the conventional barbecue grill, utilization rate of the thermal energy is enhanced.

3. By rotating the knob 55 and adjusting the angle of the burning furnace 52, it is more convenient for users to control degrees of doneness of food placed on different positions in the body 10. Compared with the conventional barbecue grill, the present invention prevents food from being undercooked or overcooked.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A multi-purpose barbecue grill comprising:
    a body having
        a base disposed at a bottom of the body;
        a back sheet mounted on a front surface of the base and having a placement slot formed through the back sheet; and
            multiple insertion slots disposed at spaced intervals along a vertical direction, located above the placement slot, and each one of the multiple insertion slots formed through the back sheet; and
        two side walls mounted to two side surfaces of the base respectively, one of the two side walls having a positioning groove formed through the side wall along a longitudinal direction of the back sheet, the other one of the two side walls having an insertion hole formed through the side wall and being opposite the positioning groove, and each one of the two side walls having
            multiple supporting sets disposed at spaced intervals on an inner surface thereon along the vertical direction, and each one of the multiple supporting sets located on a same horizontal plane with a respective one of the multiple insertion slots of the back sheet and with a respective one of the multiple supporting sets of the other one of the two side walls;
    at least one lower grate detachably mounted to two corresponding said supporting sets that are located on the same horizontal plane and to one of the multiple insertion slots of the back sheet that is located on the same horizontal plane with the two corresponding supporting sets, and having
        two sides;
        a handle disposed at one of the two sides of the at least one lower grate; and
        an abutting portion disposed at the other one of the two sides of the at least one lower grate away from the handle and inserted into one of the multiple insertion slots of the back sheet;
    an upper grate mounted to the two side walls of the body;
    a rotating skewer assembly detachably mounted in the body and having
        a skewer located between the at least one lower grate and the upper grate and having
            two ends, one of the two ends of the skewer extending into the positioning groove, and the other end of the skewer extending out of the body via the insertion hole; and
        an actuator mounted to the side wall that has the insertion hole and having a connecting hole mounted to one of the two ends of the skewer that extends out of the body via the insertion hole, such that the skewer is driven to rotate by the actuator;
    a heating assembly rotatably mounted in the body, and having
        a rotating shaft located between the skewer and the upper grate, and having two ends mounted to the two side walls of the body respectively, such that the rotating shaft is rotatable relative to the two side walls;
        a burning furnace, the rotating shaft mounted through the burning furnace, such that the burning furnace is capable of rotating along with the rotating shaft;
        a heater set mounted to the body and connected to the burning furnace; and
        a knob mounted to one of the two side walls, and connected to one of the two ends of the rotating shaft, such that the burning furnace is rotatable along with the rotating shaft when the knob is rotated to make the rotating shaft rotate; and
    a drip pan detachably disposed on the base of the body, located below the at least one lower grate, and having a flange abutting against the placement slot of the back sheet.

2. The multi-purpose barbecue grill as claimed in claim 1, wherein each one of the two side walls has
    multiple heating vents, and each one of the multiple heating vents formed through the inner surface of the side wall;
    multiple side air vents, and each one of the multiple side air vents formed through an outer surface of the side wall; and
    multiple top air vents, and each one of the multiple top air vents formed through a top surface of the side wall.

3. The multi-purpose barbecue grill as claimed in claim 2, wherein the body has a baffle mounted to the two side walls of the body, disposed between the two side walls, facing the back sheet, and obstructing the burning furnace.

4. The multi-purpose barbecue grill as claimed in claim 3, wherein the baffle has multiple vents, part of the multiple vents are formed through an inner surface of the baffle, and the rest of the multiple vents are formed through an outer surface of the baffle.

5. The multi-purpose barbecue grill as claimed in claim 3, wherein the knob has a sleeve covering an outer surface of the knob.

6. The multi-purpose barbecue grill as claimed in claim 3, wherein the positioning groove has
    a horizontal section disposed away from the back sheet; and
    a vertical section communicating with the horizontal section and disposed adjacent to the back sheet.

7. The multi-purpose barbecue grill as claimed in claim 3, wherein the heater set has
    a gas canister fixed on one of the two side walls of the body and communicating with the burning furnace via the rotating shaft; and
    a tap connected to the burning furnace.

8. The multi-purpose barbecue grill as claimed in claim 2, wherein the knob has a sleeve covering an outer surface of the knob.

9. The multi-purpose barbecue grill as claimed in claim 2, wherein the positioning groove has
    a horizontal section disposed away from the back sheet; and
    a vertical section communicating with the horizontal section and disposed adjacent to the back sheet.

10. The multi-purpose barbecue grill as claimed in claim 2, wherein the heater set has
    a gas canister fixed on one of the two side walls of the body and communicating with the burning furnace via the rotating shaft; and
    a tap connected to the burning furnace.

11. The multi-purpose barbecue grill as claimed in claim 1, wherein the body has a baffle mounted to the two side walls of the body, disposed between the two side walls, facing the back sheet, and obstructing the burning furnace.

12. The multi-purpose barbecue grill as claimed in claim 11, wherein the baffle has multiple vents, part of the multiple vents are formed through an inner surface of the baffle, and the rest of the multiple vents are formed through an outer surface of the baffle.

13. The multi-purpose barbecue grill as claimed in claim 12, wherein the knob has a sleeve covering an outer surface of the knob.

14. The multi-purpose barbecue grill as claimed in claim 12, wherein the positioning groove has
    a horizontal section disposed away from the back sheet; and
    a vertical section communicating with the horizontal section and disposed adjacent to the back sheet.

15. The multi-purpose barbecue grill as claimed in claim 11, wherein the knob has a sleeve covering an outer surface of the knob.

16. The multi-purpose barbecue grill as claimed in claim 11, wherein the positioning groove has
    a horizontal section disposed away from the back sheet; and
    a vertical section communicating with the horizontal section and disposed adjacent to the back sheet.

17. The multi-purpose barbecue grill as claimed in claim 11, wherein the heater set has
    a gas canister fixed on one of the two side walls of the body and communicating with the burning furnace via the rotating shaft; and
    a tap connected to the burning furnace.

18. The multi-purpose barbecue grill as claimed in claim 1, wherein the knob has a sleeve covering an outer surface of the knob.

19. The multi-purpose barbecue grill as claimed in claim 1, wherein the positioning groove has
    a horizontal section disposed away from the back sheet; and
    a vertical section communicating with the horizontal section and disposed adjacent to the back sheet.

20. The multi-purpose barbecue grill as claimed in claim 1, wherein the heater set has
    a gas canister fixed on one of the two side walls of the body and communicating with the burning furnace via the rotating shaft; and
    a tap connected to the burning furnace.

* * * * *